US008451995B2

(12) United States Patent
Canu et al.

(10) Patent No.: US 8,451,995 B2
(45) Date of Patent: *May 28, 2013

(54) USER STATUS MANAGEMENT IN A VOICE CALLING ARCHITECTURE

(75) Inventors: Marco Canu, Rome (IT); Barbara Febonio, Rome (IT); Rosario Gangemi, Rome (IT); Sandro Piccinini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,464

(22) Filed: Mar. 9, 2012

(65) Prior Publication Data

US 2012/0163569 A1 Jun. 28, 2012

Related U.S. Application Data

(63) Continuation of application No. 12/349,135, filed on Jan. 6, 2009.

(51) Int. Cl.
*H04M 11/00* (2006.01)
*H04M 1/64* (2006.01)
*H04M 1/56* (2006.01)
*H04M 15/00* (2006.01)

(52) U.S. Cl.
USPC ............... 379/142.05; 379/88.11; 379/88.12; 379/93.17; 379/142.17; 379/373.03

(58) Field of Classification Search
USPC ............ 379/142.01, 142.06, 142.17, 215.01, 379/93.17, 93.23, 88.11, 88.12, 88.19, 88.2, 379/88.21, 142.05, 142.07, 373.01, 373.03, 379/373.04
See application file for complete search history.

(56) References Cited

U.S. PATENT DOCUMENTS

| 6,175,616 | B1 | 1/2001 | Light et al. | |
|---|---|---|---|---|
| 6,430,289 | B1 | 8/2002 | Liffick | |
| 6,950,503 | B2 * | 9/2005 | Schwartz et al. | 379/88.13 |
| 7,634,069 | B2 * | 12/2009 | Randall et al. | 379/93.17 |
| 8,019,056 | B2 * | 9/2011 | Worley et al. | 379/88.18 |
| 2004/0247096 | A1 * | 12/2004 | Nakatsu | 379/88.18 |
| 2005/0002498 | A1 * | 1/2005 | Kao | 379/88.12 |
| 2006/0072715 | A1 * | 4/2006 | Michael et al. | 379/88.12 |
| 2006/0188084 | A1 * | 8/2006 | Rogers et al. | 379/265.01 |
| 2008/0159514 | A1 * | 7/2008 | Phillips et al. | 379/215.01 |

OTHER PUBLICATIONS

USPTO U.S. Appl. No. 12/349,135.

(Continued)

*Primary Examiner* — Binh Tieu
(74) *Attorney, Agent, or Firm* — Francis Lammes; Stephen J. Walder, Jr.; John D. Flynn

(57) ABSTRACT

A mechanism for indicating a specific response message to be played to a caller is provided. A call that comprises an identification of a caller is received in a recipient device. If the recipient device is operating in the phone management mode, a recipient notification of the call is blocked on the recipient device. If the caller is identified as a known caller based on the identification of the caller, a caller specific response message is sent to the known caller. The caller specific response message is at least one of an interactive or a non-interactive caller specific response message. The interactive response message includes a code with which to respond. If the response message is the interactive response message and the caller enters the code associated with the interactive response message, then the recipient notification of the call is activated on the recipient device.

8 Claims, 4 Drawing Sheets

OTHER PUBLICATIONS

"phoneAlarm v2.09", pocketMax—phoneAlarm (Profiles and alarms), http://www.pocketmax.net/phoneAlarm.html, printed Oct. 9, 2008, pp. 1-7.

"Spb Phone Suite", Spb Software House, http://www.spbsoftwarehouse.com/products/phonesuite/?en, printed Oct. 9, 2008, 1 page.

Schulzrinne, H. et al., "RTP Profile for Audio and Video Conferences with Minimal Control", Network Working Group, Request for Comments: 1890, Standards Track, http://www.ietf.org/rfc/rfc1890.txt, Jan. 1996, pp. 1-16.

Schulzrinne, H. et al., "RTP: A Transport Protocol for Real-Time Applications", Network Working Group, Request for Comments: 1889, Standards Track, http://www.ietf.org/rfc/rfc1889.txt, Jan. 1996, pp. 1-66.

Interview Summary dated Aug. 29, 2012 for U.S. Appl. No. 12/349,135; 3 pages.

Office Action mailed Jun. 8, 2012 for U.S. Appl. No. 12/349,135; 14 pages.

Response to Office Action filed Aug. 29, 2012, U.S. Appl. No. 12/349,135, 15 pages.

* cited by examiner

USER STATUS MANAGEMENT IN A VOICE CALLING ARCHITECTURE

This application is a continuation of application Ser. No. 12/349,135, filed Jan. 6, 2009, status pending.

BACKGROUND

The present application relates generally to an improved data processing system and method. More specifically, the present application is directed to user status management in a voice calling architecture.

Developers are constantly incorporating more and more features and technology into telecommunication systems. In fact, telecommunication systems have advanced tremendously in recent years. For example, wireless devices use a variety of digital modulation techniques, Code Division Multiple Access (CDMA), Global System for Mobile Communications (GSM), General Packet Radio Service (GPRS), and Enhanced Data Rates for Global Evolution (EDGE). Likewise, traditionally wired devices may now use Voice-Over-Internet Protocol as a means of connectivity. Regardless of modulation technique, wireless devices have a myriad of features, such as electronic phonebooks, speed dialing, single button voicemail access, and messaging capabilities. These are only a sample of features that are capable of, or have already been implemented into, telecommunication systems.

However, when a caller makes a phone call to another person, the caller is limited in identifying the status of the called party. That is, the caller may be presented with a busy signal that indicates the user is busy, presented with a voicemail if the called party subscribes to such a service, or presented with the called part answering the phone.

SUMMARY

In one illustrative embodiment, a method, in a data processing system, is provided for indicating a specific response message to be played to a caller. The illustrative embodiment receives, in a recipient device, a call from a caller. In the illustrative embodiment the call comprises an identification of a caller. The illustrative embodiment determines if the recipient device is in a phone management mode. Responsive to the recipient device being in the phone management mode, the illustrative embodiment blocks a recipient notification of the call on the recipient device. The illustrative embodiment determines if the call originates from a set of known callers based on the identification of the caller. Responsive to identifying that the caller is a known caller in the set of known callers, the illustrative embodiment responds to the known caller with a caller specific response message based on the identification of the caller. In the illustrative embodiment, the caller specific response message is at least one of a interactive caller specific response message or a non-interactive caller specific response message. In the illustrative embodiment, the interactive response message includes a code with which to respond to the recipient device. Responsive to the response message being the interactive response message and the caller entering the code associated with the interactive response message, the illustrative embodiment activates the recipient notification of the call on the recipient device.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
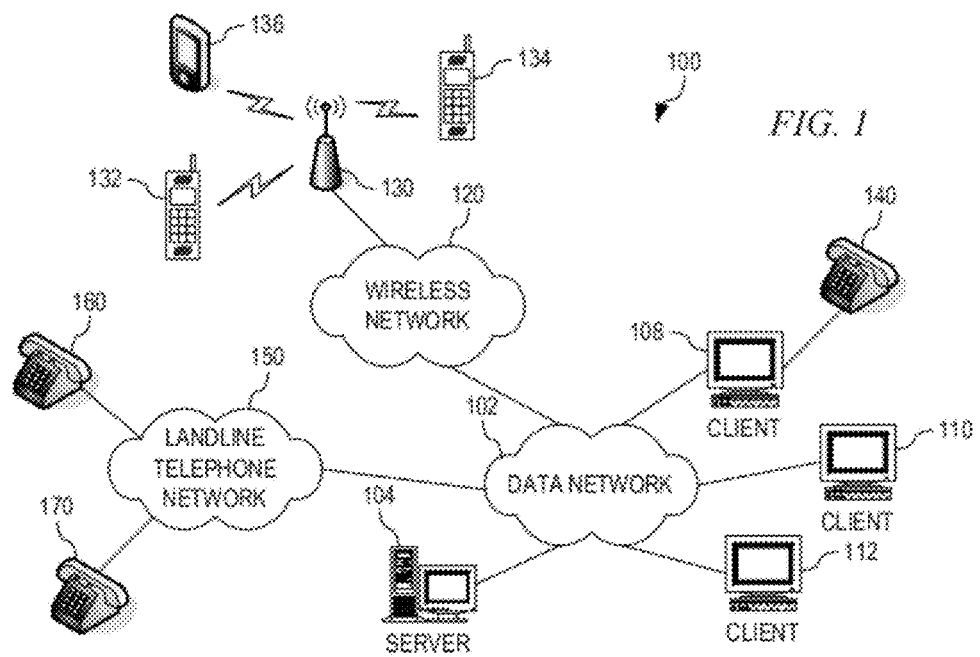
FIG. 1 is an exemplary diagram of a system of communication networks and communication devices in which exemplary aspects of the illustrative embodiments may be implemented.

The illustrative embodiments provide a mechanism where the status of a recipient device is managed by a recipient at a client level without requiring a change at a network level. Since the status is managed at recipient side, the recipient may locally define multiple profiles related to different sets of callers in order to react differently to the different sets of callers. Furthermore, managing the status of the recipient device by the recipient at a client level allows the recipient to manage the status, such that multiple responses may be indicated to the different sets of callers. By allowing multiple responses, the recipient of the recipient device may also be provided with an interactive mechanism, such that, in responding to a specific caller, the recipient may also provide a predetermined interactive response. The predetermined interactive response provides a response code to the caller. If the caller inputs the response code, then the recipient device of the recipient is activated, i.e. rings, vibrates, or the like, even though the status of the recipient devices indicates a non-interrupt status.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the illustrative embodiments are described with regard to using standard telephone devices to characterize the operation of a mechanism that indicates a specific response to be played to a caller based on a preset status of the recipient, the illustrative embodiments are not limited to such. Rather, any mechanism capable of receiving a preset status of the recipient and responding to the caller using a predetermined response based on the status of the recipient and the identity of the caller may be used without departing from the spirit and scope of the present invention.

Figure 2:
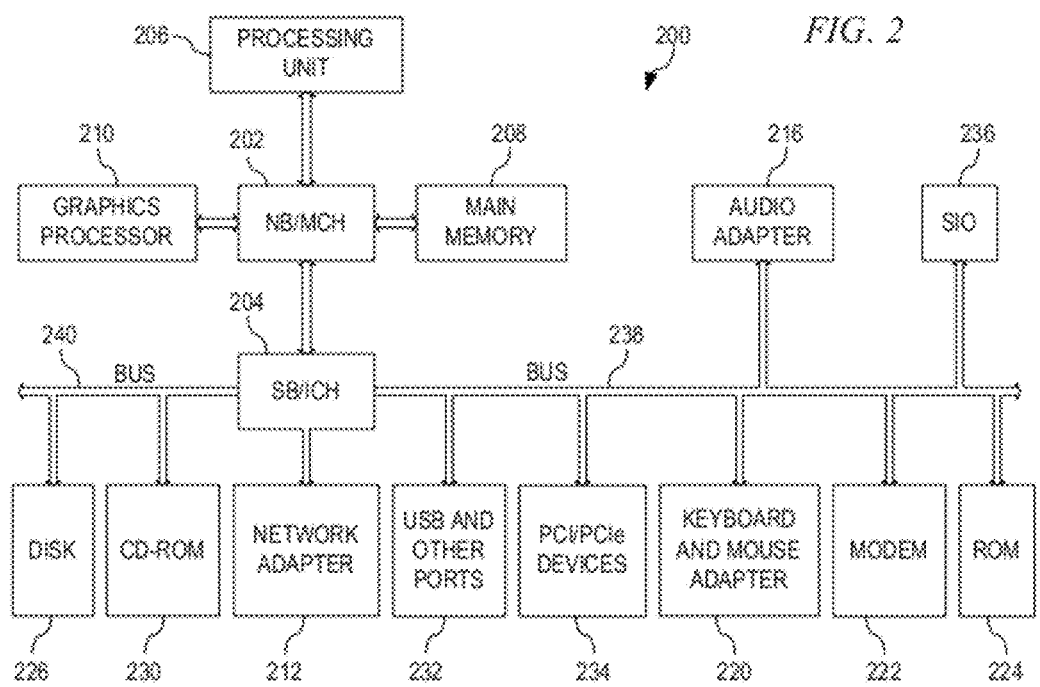
FIG. 2 shows a block diagram of an example data processing system in which aspects of the illustrative embodiments may be implemented.

The illustrative embodiments provide mechanisms for indicating a plurality of statuses and a plurality of responses such that a recipient device responds to an incoming call with one of the plurality of responses based on the status of the recipient device and based on the identity of the caller. As such, the mechanisms of the illustrative embodiments are especially well suited for implementation within a communication environment and within, or in association with, communication devices, such as communication switches, client devices, voicemail systems, and the like. In order to provide a context for the description of the mechanisms of the illustrative embodiments, FIGS. 1 and 2 are provided hereafter as examples of a communication system, or environment, and a communication device, in which, or with which, the mechanisms of the illustrative embodiments may be implemented. It should be appreciated that FIGS. 1 and 2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 is an exemplary diagram of a system of communication networks and communication devices in which exemplary aspects of the illustrative embodiments may be implemented. As shown in FIG. 1, system 100 includes a plurality of networks 102, 120, and 150. In particular, data network 102, wireless network 120, and landline telephone network 150 are depicted. It should be noted that while only these three types of networks are depicted in FIG. 1, the present invention is not limited to only these types of networks or does not require the inclusion of all of these types of networks. Other types of communication networks may be used in addition to or in replacement of one or more of depicted networks 102, 120, and 150 without departing from the spirit and scope of the present invention.

Data network 102 may comprise one or more networks of the same or different types. For example, data network 102 may comprise one or more local area networks (LANs), wide area networks (WANs), the Internet, and the like. Similarly, wireless network 120 and landline telephone network 150 may comprise one or more networks of the same or different types. Essentially, any number and type or combination of types of communication networks may be used with the illustrative embodiments without departing from the spirit and scope of the present invention.

Each network 102, 120, and 150 has one or more communication devices coupled to it through either wired or wireless communication links. For example, data network 102 has server 104 and client devices 108-112 coupled to it via communication links generally known in the art. In addition, client device 108 has associated telephone communication device 140 which communicates with other wired or wireless telephone devices via client device 108 and data network 102, e.g., via Internet telephony using Voice over Internet protocol (VoIP). Client devices 108-112 and/or telephone communication device 140 preferably have the capability to perform one or more of voice telephone communications, electronic mail message communications, instant text message communications, and the like.

Wireless network 120 has a plurality of wireless communication devices 132, 134, and 136 which communicate via wireless network 120 through wireless communication point 130, e.g., a cellular base station, wireless access point, or the like. Wireless communication devices 132, 134, and 136 may be, for example, wireless telephones, personal digital assistants, pagers, or the like. Wireless communication devices 132, 134, and 136 preferably have the capability to perform one or more of voice telephone communications, electronic mail message communications, instant text message communications, and the like.

Landline telephone network 150 has a plurality of wired or landline communication devices 160 and 170 coupled to it via wired links as are generally known in the art. As with the other communication devices described above, landline telephone devices 160 and 170 preferably have the capability to perform one or more of voice telephone communications, electronic mail message communications, instant text message communications, and the like.

The various wireless communication devices 132, 134, and 136 and wired communication devices 108-112, 140, 160, and 170 may maintain an associated voicemail data structure on a voicemail system operating on server 104 or client devices 108-112 that answers a caller when the recipient is either not able to or does not want to answer the phone and if the caller leaves a voice message, voicemail allows the recipient to retrieve, send, and manage those voice messages using one of communication devices 108-112, 132-136, 140, 160, or 170.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As mentioned above, the illustrative embodiments provide a mechanism where the status of a recipient device is managed by a recipient at a client level without requiring a change at a network level. Since the status is managed at recipient side, the recipient may locally define multiple profiles related to different sets of callers in order to react differently to the different sets of callers. Furthermore, managing the status of the recipient device by the recipient at a client level allows the recipient to manage the status, such that multiple responses may be indicated to the different sets of callers. By allowing multiple responses, the recipient of the recipient device may also be provided with an interactive mechanism, such that, in responding to a specific caller, the recipient may also provide a predetermined interactive response. The predetermined interactive response provides a response code to the caller. If the caller inputs the response code, then call notification of the recipient is activated even though the status of the recipient devices indicates a non-interrupt status.

Figure 3:
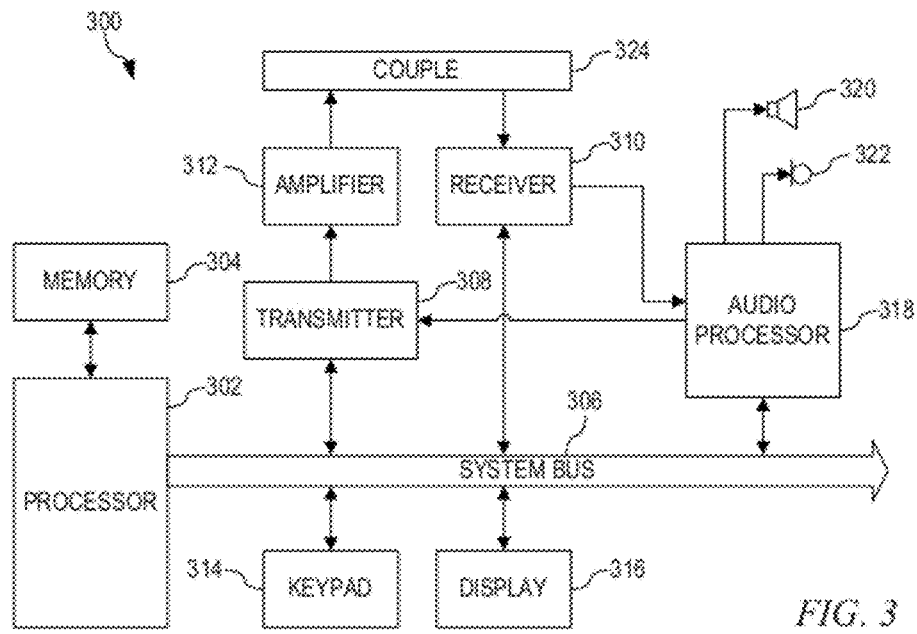
FIG. 3 is an exemplary block diagram of a communication device in which exemplary aspects of the illustrative embodiments may be implemented.

FIG. 3 is an exemplary block diagram of a communication device in which exemplary aspects of the illustrative embodiments may be implemented. Communication device 300 includes processor 302 for controlling operation of the communication device and a memory 304. Processor 302 may be a general-purpose microprocessor operating under the control of instructions stored in a memory, such as memory 304, or device-specific circuitry for controlling the operation of communication device 300. Processor 302 is connected by system bus 306 to transmitter 308, receiver 310, keypad 314, display 316, and audio processor 318. Keypad 314 may be a keypad and/or buttons. Display 316 may be any type of display device including a liquid crystal display (LCD) or other known displays, such as a cathode ray tube or active matrix display.

Transmitter 308 and receiver 310 are coupled to a communication signal by couple 324 to provide full duplex communication. The communication signal may be provided by a telephone line (not shown) in a land-based telephone or an antenna, such as for a wireless telephone. Audio processor 318 provides basic analog audio outputs to speaker 320 and accepts analog audio inputs from microphone 322. Received signals are demodulated and decoded by receiver 310. Transmitter 308 encodes and modulates signals passed to it by processor 302 or audio processor 318. The output of the transmitter is amplified by power amplifier 312 to control the power level at which the signal is transmitted.

Processor 302 or audio processor 318 may detect audible call status information and call status codes received by receiver 310. Memory 304 may include a lookup table associating call status information or call status codes with visual call status information, such as text messages. Processor 302 detects or receives a call status code and displays an appropriate call status message on display 316. Those of ordinary skill in the art will appreciate that the hardware depicted in FIG. 3 may vary.

The call status message displayed to the recipient on display 316 may be an identification of the caller, such as the name and phone number of the caller, just the phone number of the caller, the identifier of "unknown" if the caller does not want their information displayed, or the like. Providing the name and/or phone number or other identification of the caller to the recipient is generally referred to as caller identification or caller ID. The illustrative embodiments provide a mechanism for the recipient device to use the identification of the caller to indicate a specific response message to play to a caller based on the identification of the caller.

Figure 4:
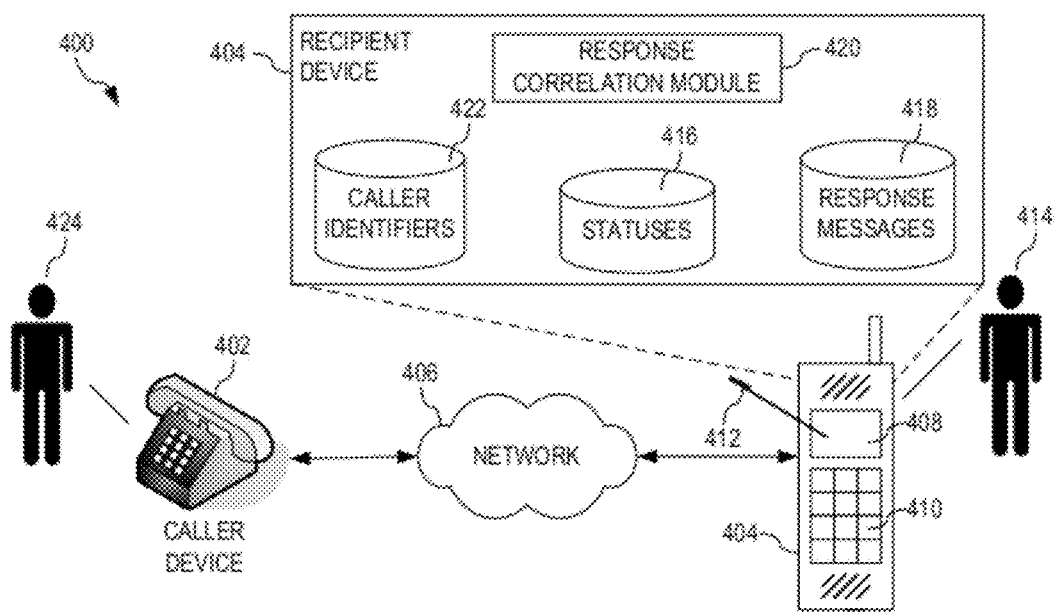
FIG. 4 is an exemplary block diagram of the primary operational elements of a communication system in accordance with one illustrative embodiment.

FIG. 4 is an exemplary block diagram of the primary operational elements of a communication system in accordance with one illustrative embodiment. As shown in FIG. 4, communication system 400 includes caller device 402 and recipient device 404 that may be connected via communication network 406. Communication network 406 may be made up of one or more communications networks, such as data network 102, wireless network 120, and landline telephone network 150 of FIG. 1. Recipient device 404 and caller device 402 are communication devices, such as communication device 300 of FIG. 3. As shown above, recipient device 404 may include display 408, keypad 410, and stylus 412.

Recipient device 404 may be programmed by recipient 414 with a plurality of statuses 416 which may correlate to different statuses that recipient 414 may need to use, such as "Available or No Status," "Out of the Office," "Meeting," "Vacation," or the like. By recipient 414 selecting one of statuses 416 other than "Available or No Status", recipient device 404 is placed into a phone management mode, where recipient device 404 uses response correlation module 420 to answer incoming phone calls. Recipient device 404 may also be programmed by recipient 414 with a plurality of response messages 418. Response messages 418 may includes non-interactive response messages, such as "I am in a meeting," "I am out of the office on vacation," "Call my secretary," "Please add me to your do-not-call list," or any other response message recipient records. Response messages 418 may also include interactive messages, such as "I am in a meeting but if this is an emergency, please enter code 1254 followed by the pound sign and I will be contacted immediately." Recipient device 404 may further be programmed by recipient 414 with a plurality of caller identifiers 422, which may include a caller's name, telephone numbers, email address, or the like.

Using response correlation module 420 in recipient device 404, recipient 414 is provided with the capability to associate one or more of statuses 416 with one or more if response messages 418 and with one or more of caller identifiers 422. Using response correlation module 420, a recipient 414 may indicate that, for a specific one of statuses 416, recipient device 404 will respond with a predetermined one of response messages 418 to a specific caller based on the status indicated by recipient 414 and caller information associated with a calling party. For example, if recipient 414 indicates a status on recipient device 404 of "Meeting," then, in response to an incoming call from caller 424, response correlation module 420 blocks recipient notification to recipient 414. Instead, response correlation module 420 uses an identification of the caller or the caller information associated with the incoming call to determine if a telephone number, name, or other information identified by the caller information, is associated with a caller identifier in caller identifiers 422. If the caller information of caller device 402 is associated with any one of the known caller identifiers in caller identifiers 422, then response correlation module 420 determines if recipient 414 has programmed a caller specific one of response messages 418 to be played to caller 424 based on the indicated status from statuses 416. If recipient 414 has indicated a specified response to be played to caller 424, then recipient device 404 plays the response message identified by response correlation module 420 to caller device 402, which is then played by caller device 402 to caller 424.

As stated previously, recipient 414 is able to program recipient device 404 with different responses, both non-interactive and interactive, to be played to different callers even under the same status. For example, if caller 424 is a unidentifiable caller based on the caller information being incomplete or blocked, or if the caller information docs not associate with any of the caller identifiers in caller identifiers 422, then response correlation module 420 may identify that a general response message of "I am in a meeting" is the response indicated by recipient 414 that is to be played to caller 424. However, if response correlation module 420 determines that the caller information indicates that the caller is a known business associate, then response correlation module 420 may identify that a response message of "I am in a meeting, please call my secretary" is the response indicated by recipient 414 that is to be played to caller 424. Further, if response correlation module 420 determines that the caller is a family member or recipient's 424 boss, then response correlation module 420 may identify that a interactive response message of "I am in a meeting, please enter code 3428 to reach me if this is an emergency" is the response indicated by recipient 414 that is to be played to caller 424.

When recipient device 404 responds to a call with a non-interactive response, recipient device 404 plays the identified response message and then ends the phone call by hanging-up the connection. However, when recipient device 404 responds to a call with an interactive response, recipient device 404 plays the identified interactive response message and waits for a response from caller 424. If caller 424 ends the call by disconnecting or hanging-up, then recipient device also closes its end of the connection. On the other hand, if caller 424 responds with the identified code, then recipient device 404 activates the recipient notification to recipient 414, thereby either ringing, vibrating, initiating a display lighting sequence, or the like, on recipient device 404.

Thus, the illustrative embodiments provide a mechanism where the recipient indicates one or more recorded messages to be played to incoming callers based on a status and phone management mode that the recipient's device is placed in. When the recipient device responds to a call, the recipient device plays either an interactive or non-interactive message. If an interactive message is played, then the caller may enter an identified code and the recipient is then notified of the incoming call.

Figure 5:
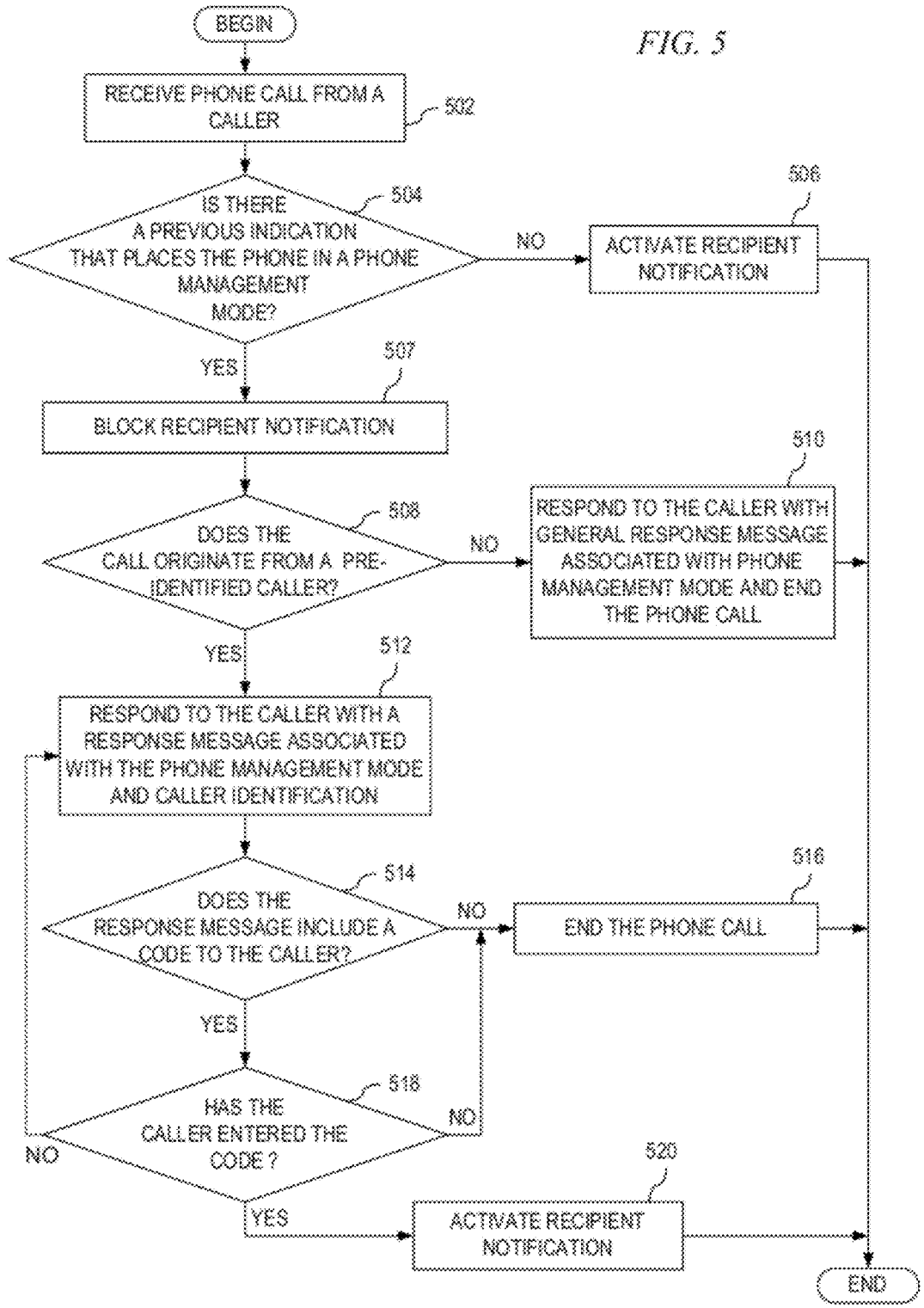
FIG. 5 is an exemplary flow diagram of the operation performed in a recipient device in accordance with one illustrative embodiment.
Figure 6:
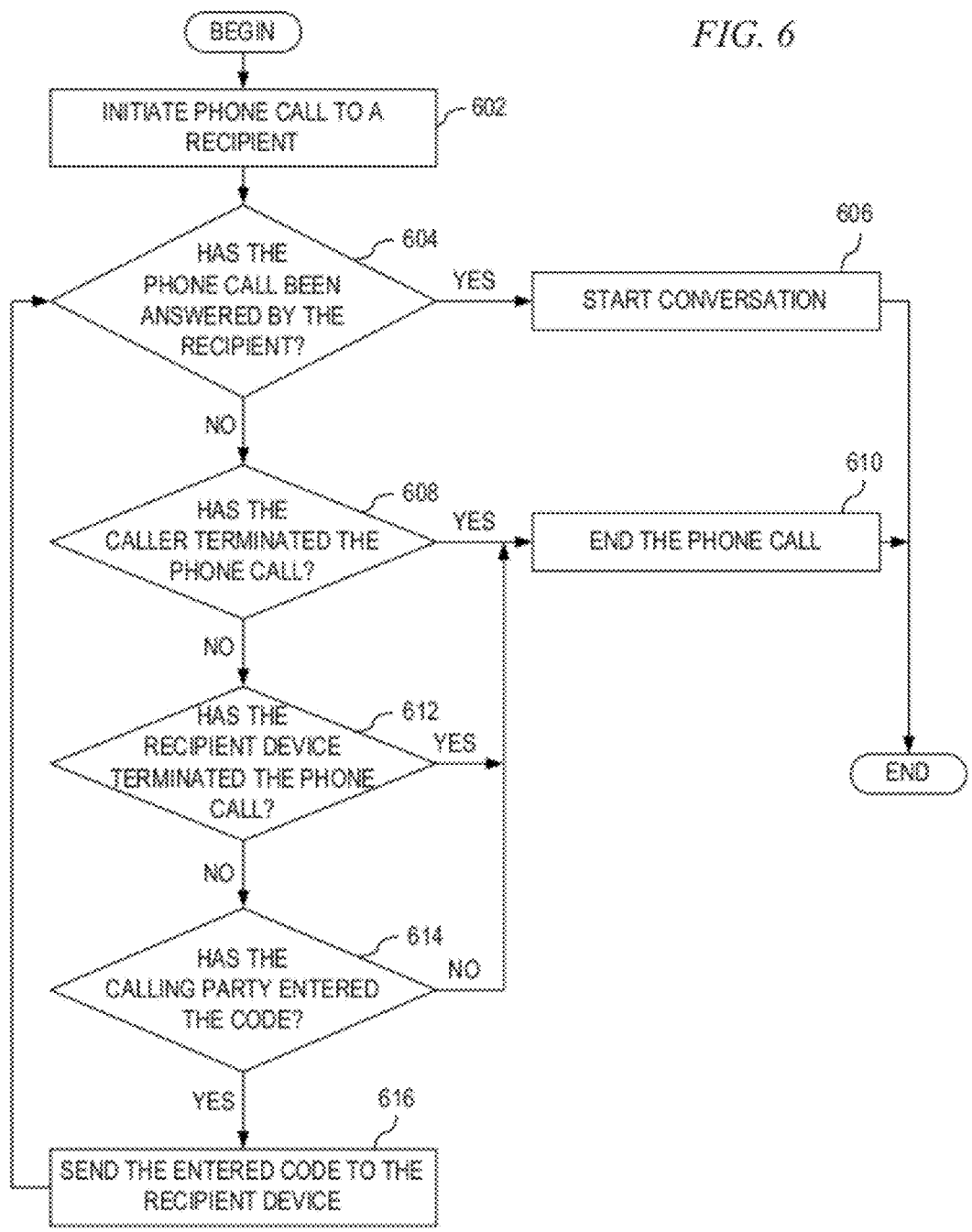
FIG. 6 is an exemplary flow diagram of the operation performed in a caller device in accordance with one illustrative embodiment.

FIGS. 5 and 6 are flowcharts that illustrate the primary operation of a communication system that identifies a specific response to play to a caller in response to a status and phone management mode according to the invention. FIG. 5 is an exemplary flow diagram of the operation performed in a recipient device in accordance with one illustrative embodiment. As the operation begins, a recipient device receives a phone call from a calling device (step 502). The recipient device determines if a previous indication has been received from the recipient that places the recipient device in a phone management mode (step 504). If at step 504 no previous indication has been received that places the recipient device in a phone management mode, then the recipient device activates recipient notification on the phone (step 506), with the operation ending thereafter.

If at step 504 a previous indication has been received that places the recipient device in a phone management mode, then the recipient device blocks the recipient notification (step 507) and determines if the call originates from a pre-identified caller (step 508). The recipient device may determine if the call originates from a pre-identified caller using caller information of the incoming call to caller identifiers stored in the recipient device. The recipient device may determine if a telephone number, name, or other information identified by the caller information, is associated with a caller identifier in the caller identifiers. If at step 508 the call does not originate from a pre-identified caller, then the recipient device may respond to the call with a general message that is associated with the phone management mode (step 510), with the operation ending thereafter.

If at step 508 the recipient device identifies that the call originates from a pre-identified caller, then the recipient device responds to the caller with a caller specific response message associated with the phone management mode and the caller information that has been indicated by the recipient (step 512). The response message that is played to the caller may be one of an interactive or non-interactive message. The recipient device determines if the response message that is played is an interactive message (step 514). If at step 514 the response message is not an interactive message, then once the entire response message is played to the recipient, then he recipient device ends the phone call (step 516), with the operation ending thereafter.

If at step 514 the response message is an interactive message, then the recipient device determines if the caller has entered the code associated with the interactive response message (step 518). If at step 518 the caller does not enter the code or enters a wrong code, then the recipient device may either return to step 512 and replay the response message associated with the phone management mode and the caller information that has been indicated by the recipient or proceed to step 516 and end the phone call. If at step 518 the caller enters the correct code, then the recipient device activates recipient notification on the phone (step 520), with the operation ending thereafter.

FIG. 6 is an exemplary flow diagram of the operation performed in a caller device in accordance with one illustrative embodiment. As the operation begins, a caller device initiates a phone call to a recipient (step 602). The caller device determines if the call connection has been completed by the recipient answering the call (step 604). If at step 604 the call connection has been completed by the recipient answering the phone call, then the caller may start a conversation with the caller (step 606). If at step 604 the call connection has not been completed by the recipient answering the phone call, then the caller device may receive any number of responses to the call, such as a ring-no-answer where the phone continuously rings without anyone answering the phone call, a busy signal indicating the recipient is already using the recipient device, an answering machine answers the phone call, or, in the case of the illustrative embodiment, responding with a response message.

Thus, from step 604 the caller may either terminate the call or listen to any response message that has been received (step 608). If at step 608 the caller self-terminates the call, then the caller device ends the call (step 610), with the operation ending thereafter. If at step 608 the caller does not terminate the call because the call is a response message from the recipient device, then the caller device determines if the recipient device has terminated the phone call (step 612). If at step 612 the recipient device terminates the call, then the operation proceeds to step 610. If at step 612 the recipient device fails to terminate the call, then the caller device determines if the caller has entered a code (step 614). If the caller fails to enter a code after a predetermined amount of time, then the operation proceeds to step 610. If at step 614 the caller enters a code before the end of the predetermined time period, then the caller device sends the entered code to the recipient device (step 616), with the operation returning to step 604 thereafter.

Thus, the illustrative embodiments provide for a recipient to indicate a specific response message to play to a caller based the identification of the caller and a phone management mode that the recipient device is operating under. When the recipient device responds to the incoming phone call, the recipient device may specify either a non-interactive or an interactive response message. If the response message is non-interactive, then the recipient device terminates the call connection after the response message has been played. If the response message is interactive, then the caller may then enter a code associated with the interactive response message, at which time the recipient device will activate a recipient notification on the recipient device.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for indicating a specific response message to be played to a caller, the method comprising:

receiving, in a recipient device, a call from a caller, wherein the call comprises an identification of a caller;

determining lithe recipient device is in a phone management mode;

responsive to the recipient device being in the phone management mode, blocking a recipient notification of the call on the recipient device;

determining if the call originates from a set of known callers based on the identification of the caller;

responsive to identifying that the caller is a known caller in the set of known callers, responding to the known caller with a caller specific response message based on the identification of the caller, wherein the caller specific response message is at least one of a interactive caller specific response message or a non-interactive caller specific response message and wherein the interactive response message includes a code with which to respond to the recipient device; and responsive to the response message being the interactive response message and the caller entering the code associated with the interactive response message, activating the recipient notification of the call on the recipient device.

2. The method of claim 1, further comprising:

responsive to the recipient device failing to be in the phone management mode, activating the recipient notification of the call on the recipient device.

3. The method of claim 1, further comprising:

responsive to a failure to identify that the caller is within the set of known callers, responding to the caller with a general response message; and ending the phone call.

4. The method of claim 3, further comprising:

responsive to the caller specific response message being the non-interactive caller specific response message, responding to the caller with the caller specific non-interactive response message; and ending the phone call.

5. The method of claim 1, wherein the phone management mode is based on a status that a recipient places the recipient device in.

6. The method of claim 1, wherein the identification of the caller comprises at least one of a telephone number, a name, or an email address.

7. The method of claim 1, wherein the recipient device is at least one of a telephone, a voice over internet protocol device, a wireless telephone, or a personal digital assistant.

8. The method of claim 1, wherein the code is a numerical code entered on a keypad of a caller device associated with the caller.

\* \* \* \* \*